Figure 1:
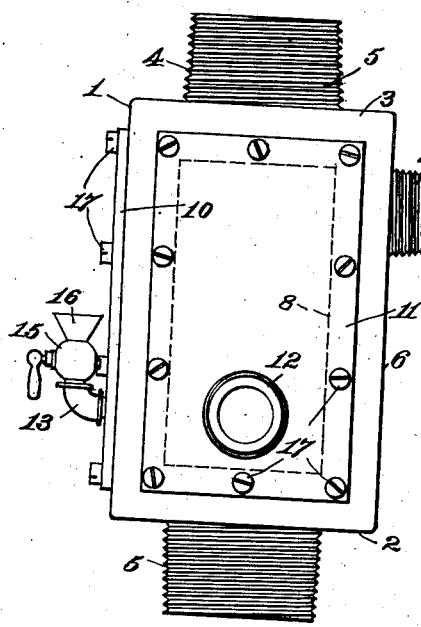

June 11, 1935.　　　　E. N. SORENSEN　　　　2,004,252
FUEL CONDITIONING DEVICE
Filed March 8, 1935

Inventor
Einar N. Sorensen
By Joshua R H Potts
Attorney

Patented June 11, 1935

2,004,252

UNITED STATES PATENT OFFICE 2,004,252

FUEL CONDITIONING DEVICE

Einar N. Sorensen, Fernandina, Fla.

Application March 8, 1935, Serial No. 10,065

6 Claims. (Cl. 257—232)

My invention relates to fuel conditioning devices; that is, to devices for conditioning heavy oils known as distillates, so that they may be used as fuels for internal-combustion engines.

The object of my invention is to provide a device of the character mentioned which will enable internal-combustion engines to be operated efficiently with heavy oils such as distillates. A further object of my invention is to provide a device of the class mentioned, of such construction that the same shall be adapted for use in conjunction with any type of internal combustion engine irrespective of the relative position of the intake and carburetor. A further object of my invention is to provide a device as mentioned which may be readily and quickly cleaned so as to maintain the efficiency of the device. Other objects will appear hereinafter.

My invention consists generally in a suitable housing adapted to be arranged between the carburetor and the intake manifold of an engine and adapted to be heated, preferably from the engine exhaust, so that the atomized fuel and air from the carburetor will be heated and gasified before entering the manifold. In order to heat the device, a duct for the hot exhaust gases is extended longitudinally through the housing and is equipped with a plurality of spurs extending through the walls of said duct and projecting both into said duct and into the housing about the same so as to transfer a sufficient quantity of heat by conduction and radiation from the hot air duct to the chamber of the housing surrounding the same. In order to increase the agitation of the fuel as it passes through the housing, the projecting spurs are arranged in staggered relation, thereby causing a quick heating of the fuel and a more thorough mixing of the same as it is gasified.

In the various types of engines with which my device is adapted for use, such as marine engines, tractor engines, stationary engines and the like, the arrangement of the various parts vary considerably. It is therefore necessary to so construct the device that it may be placed in any suitable space where it may be accommodated and readily attached to the carburetor and engine. Also, on account of the nature of the fuel used, the projecting spurs on the exhaust conduit and the outer face of the conduit become coated with carbon so as to reduce the efficiency of the engine unless they are cleaned comparatively frequently. In order to facilitate such cleaning, three sides of the housing are made removable so as to fully expose the exhaust duct and spurs for cleaning. One of these removable sides is provided with a nipple for connecting to a pipe from the carburetor; and another of the removable sides is equipped with a priming device such as will be fully described hereinafter. The fixed or nonremovable side is provided with a nipple for connecting the lead from the housing to the intake manifold. By this arrangement the removable sides may be interchangeably positioned on the housing so as to conveniently attach the device to the several parts of the engine after it has been located in a suitable position. My invention therefore further consists in providing the housing with the several removable sides which are interchangeable and equipped as stated.

My invention further consists in various details of construction and arrangements of parts all as will be fully described hereinafter and particularly pointed out in the claims.

My invention will be more readily understood by reference to the accompanying drawing forming a part of this specification and in which—

Figure 2:
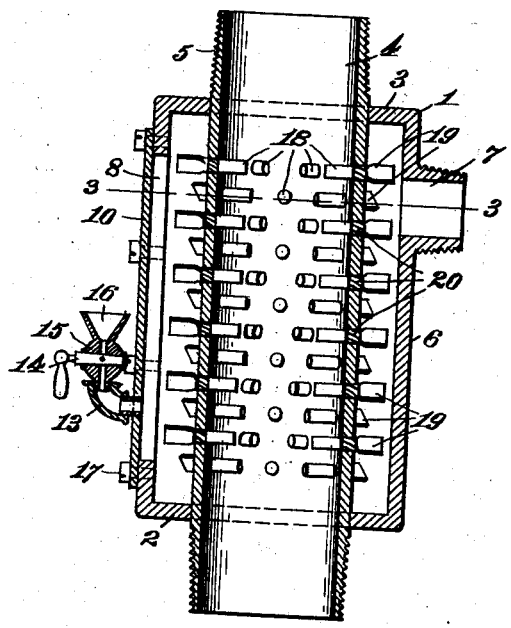
Figure 3:
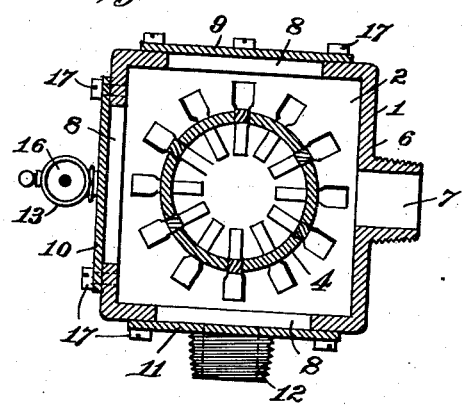

Fig. 1 is a side elevation of a fuel conditioning device embodying my invention, Fig. 2 is a vertical section of the same, Fig. 3 is a transverse section on the line 3—3 of Fig. 2, and Figs. 4, 5 and 6 are detail views upon an enlarged scale of various forms of spurs which may be used in the device.

Referring now to the drawing, 1 indicates a housing which is substantially square in horizontal cross section and vertically elongated. Extending vertically through the housing from the bottom 2 to the top 3 thereof is a duct 4 connected to the exhaust of the engine and through which the hot exhaust gases are adapted to pass. The ends of said duct extend beyond the top and bottom of the housing and are threaded as at 5 to facilitate attachment to the conduits leading from the exhaust manifold and to the muffler, neither of which are illustrated. One side 6 of the housing 1 is integral therewith and is provided with a nipple 7 for connection to a suitable lead to the intake manifold of the engine. The other three sides of the housing are open as indicated at 8 and these open sides are normally closed by side plates 9, 10 and 11 respectively. One plate 11 is provided adjacent its lower end with a nipple 12 for connection to a lead from the carburetor; and the plate 10 adjacent its lower end is provided with a priming device 13 which includes a valve 14 having a housing 15 equipped with a filling funnel 16, the purpose of which will appear hereinafter. The other side plate 9 may be plain as indicated. These plates are removable and interchangeably held in position as by screws 17.

In installing the device the housing may be positioned in any suitable, convenient place and the nipple 7 connected to the intake manifold. The removable and interchangeable sides may then be positioned on the sides of the housing where the nipple 12 will be in the most suitable position for attachment to the carburetor, and the priming device 13 arranged in convenient position.

As my invention is for use in conjunction with heavy distillates which cannot be used as fuel for internal-combustion engines until highly heated, it is evident that means must be provided for starting and initially running the engine until the conditioning device has reached the necessary temperature. It is for this reason that I provide the priming device 13 so that a quantity of gasoline may be admitted to the housing 1 which will be vaporized as the air, with the particles of the distillates are received from the carburetor. This will form an explosive mixture of sufficient richness to start the engine and maintain the same in operation until the conditioner is heated sufficiently to gasify the fuel distillate.

Figure 4:
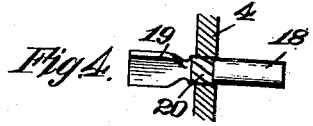
Figure 5:
Figure 6:
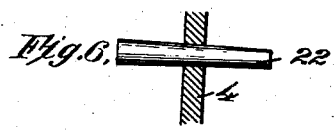

In order to utilize the maximum of the heat passing from the duct 4, I extend a plurality of spurs through the walls of said duct with one end projecting into the passageway of the duct 4 and the other end projecting into the housing. These spurs may be of various forms as illustrated in Figs. 4, 5 and 6. As shown in Fig. 4 these spurs comprise cylindrical pins 18 having transversely flattened heads 19 at their outer ends and intermediate threaded portion 20, the threads being at a high pitch so that after the duct 4 has been drilled with holes of sufficient diameter to receive the ends 18, they may be driven into anchored position as shown in Figs. 2, 3 and 4. The flat ends 19 are preferably arranged at an angle, as indicated so as to deflect the gases into a substantially spiral course as they pass through the housing. If preferred screws 21 such as shown in Fig. 5 may be tapped through said walls of the duct 4; or tapered pins 22 such as shown in Fig. 6 may be driven into position after the duct has been suitably drilled.

A device as disclosed herein is designed for the purpose of using heavy distillates for fuel such as cannot be used with an ordinarily equipped internal-combustion engine; and it should not be confused with the heaters which are designed to merely heat volatile fuels, particularly in cold weather or under adverse conditions. When using such distillates, the housing must be maintained at a very high temperature and as a result of such high temperature and the nature of the fuel, the spurs between the duct 4 and the walls of the housing, together with the outer surface of the duct 4, soon become coated with carbon, which necessitates comparative frequent cleaning of the device. It is primarily for this reason that the housing is provided with the several removable sides as without which it would be immovable to use the heavy distillates as fuel. Unless means are provided for ready access to the housing 14, it would be practically impossible to use a heavy distillate as oil, as within a short time the device would become inefficient and cease to operate. By having the removable sides interchangeable and equipped as mentioned, the device also lends itself to being positioned in any convenient place relative to the engine with which it is to be used.

I claim:

1. A conditioning device for distillates comprising a housing equipped with means for connecting the same to the intake manifold of an engine and to a carburetor, an exhaust gas duct extending therethrough, means on said duct for increasing the radiation thereof, and said housing being provided with removable sides, as and for the purpose specified.

2. A device as set forth in claim 1 in which the removable sides are interchangeable and in which the means for connection to the carburetor is formed on one of said removable sides, substantially as described.

3. A device as set forth in claim 1 in which the removable sides are interchangeable, one of said sides being equipped with the means for connection to the carburetor, and priming means on another of said removable and interchangeable sides, as and for the purpose specified.

4. A conditioning device for distillates comprising a housing provided with means for connecting the same to an intake manifold and having a plurality of removable and interchangeable sides, means on one of said sides for connection to the carburetor, a duct for hot exhaust gases extending through said housing, and a plurality of spurs extending through the walls of said duct, each of said spurs comprising an elongated end projecting into the duct passageway, a transversely flattened head projecting into the housing chamber, and an intermediate threaded portion, substantially as described.

5. A device as set forth in claim 4 in which the threads of the intermediate portion are at a high pitch to facilitate being driven into position, substantially as described.

6. A device as set forth in claim 4 in which the transversely flattened heads of the spurs are angularly disposed, as and for the purpose specified.

EINAR N. SORENSEN.